UNITED STATES PATENT OFFICE.

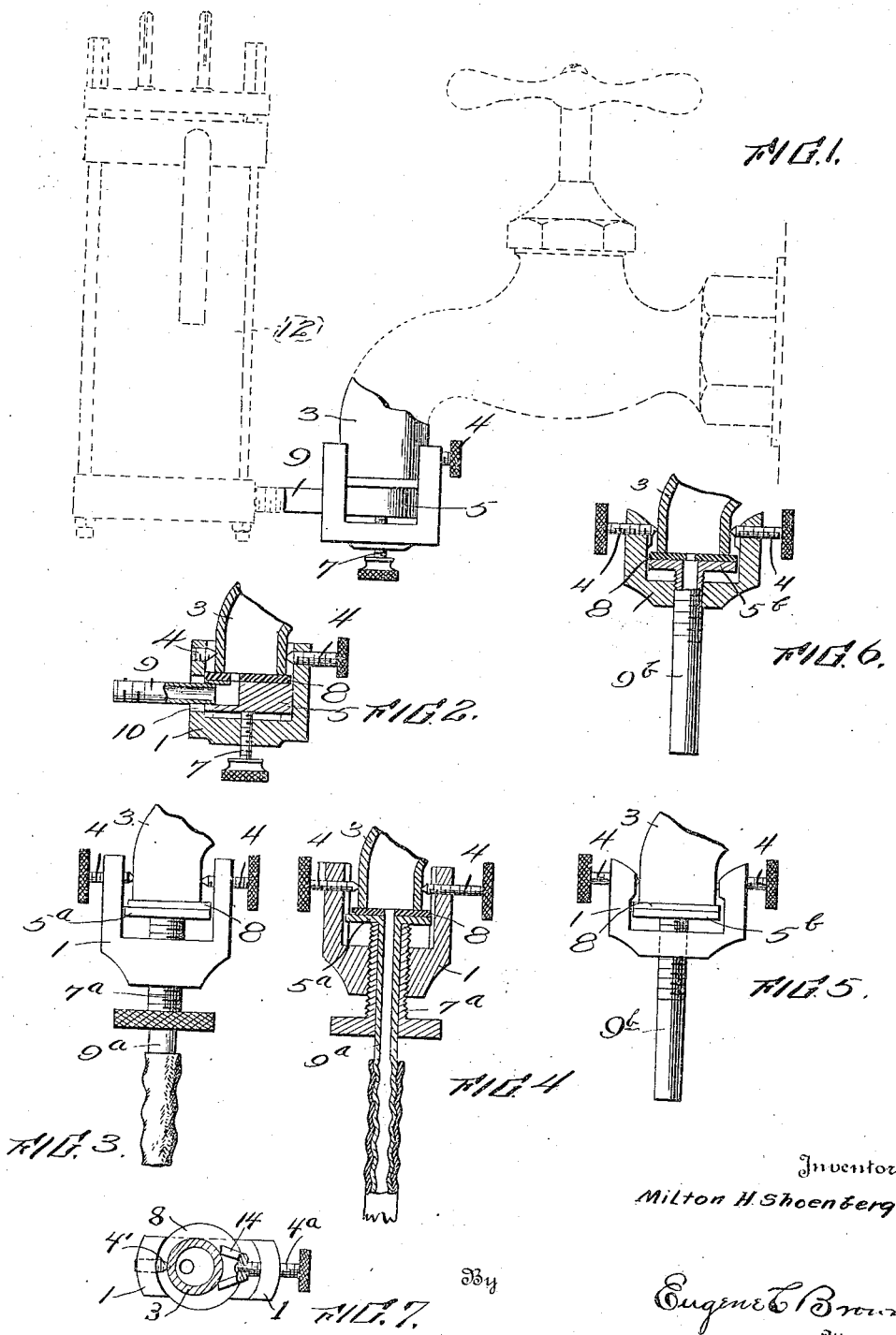

MILTON H. SHOENBERG, OF SAN FRANCISCO, CALIFORNIA, ASSIGNOR TO MAJESTIC ELECTRIC DEVELOPMENT COMPANY, A CORPORATION OF CALIFORNIA.

FLUID ATTACHMENT CLAMP.

1,279,459.

Specification of Letters Patent.

Patented Sept. 17, 1918.

Application filed April 5, 1916. Serial No. 89,180.

*To all whom it may concern:*

Be it known that I, MILTON H. SHOENBERG, a citizen of the United States, residing at San Francisco, in the county of San Francisco and State of California, have invented certain new and useful Improvements in Fluid Attachment Clamps, of which the following is a specification.

My invention relates to clamping devices for attachment to pipes, tubes, faucets, etc., and embodying an outlet channel member with means for tightly closing the joint between said member and the pipe or faucet.

The main purpose of my invention is to provide a universal clamping device that may be readily attached to any regular or irregular shaped outlet pipe without change or alteration, the clamping device being provided with means for connecting a suitable hose or tube for conducting liquids to filters, heaters, showers, etc.

In the accompanying drawings, Figure 1 is a side elevation of a clamping device embodying my invention and showing for purposes of illustration, the manner of attachment to a faucet and to an electric water heater; Fig. 2 is a vertical section of the same; Figs. 3 and 4 are side elevation and vertical section, respectively, of another form of my invention; Figs. 5 and 6 are corresponding views of another modification of my invention; and Fig. 7 is a top plan view of the clamp shown in Figs. 1 and 2, but with another form of clamping screw.

I provide a frame supporting member or yoke 1, which is securely anchored to the faucet or pipe end 3, by oppositely arranged pointed steel screws 4. In the form shown in Figs. 1 and 2, one of which may be a stationary pin as at 4', while the other is adjustable by means of the milled head as at 4. These sharp hard steel points indent the pipe or faucet slightly, perhaps almost imperceptibly but sufficiently for securely holding the clamping yoke. The outlet channel member 5 is loosely held and guided between the yoke arms and is adjustable longitudinally thereof by means of an adjusting screw 7, for the purpose of clamping a gasket 8 of rubber or other suitable material between said member and the end of the faucet or pipe to form a tight joint. The outlet channel or coupling member 5, in Figs. 1 and 2 is provided with a connecting tube 9, which projects laterally through an opening or slot 10 in one of the yoke arms which is elongated to accommodate the adjustment of the member 5. In Fig. 1, I have shown in dotted lines an electric water heater 12, attached to the connecting tube 9, but it is evident that a hose or other conduit may be connected thereto.

In the form shown in Figs. 3 and 4, the channeled outlet member or coupling $5^a$ is provided with a depending connecting tube $9^a$, which extends through the hollow stem of the adjusting screw $7^a$, threaded in an opening in the base of the yoke member 1. In this form, as in the construction of Figs. 1 and 2, the adjusting screw may be moved independently of the outlet channel member.

In the modification illustrated in Figs. 5 and 6, the outlet channel member $5^b$ is made integral with the connecting tube $9^b$ which depends therefrom and is threaded through an aperture in the base of the yoke member. The threaded connecting tube $9^b$ accordingly also serves the function of an adjusting screw and is rotated or turned to adjust the position of the channel outlet member $5^b$ to clamp the gasket tightly against the mouth of the faucet or pipe 3.

Instead of using sharp pointed screws 4, to anchor the clamping yoke to the pipe or faucet, I may employ thumb-screws $4^a$ having yoke members 14, swiveled thereto, which embrace the sides of the pipe with a wedging action as the screws are tightened until the pipe is firmly gripped with sufficient force to securely hold the clamping frame or yoke 1, as illustrated in Fig. 7. It is evident that I may employ one pointed screw or stud and one screw having a swiveled gripping yoke as illustrated in this figure or I may use two screws provided with such swiveled yoke members. I have shown several forms in which the clamping device may be embodied for the purpose of clearly disclosing my invention but it is evident that other modifications and various changes can be made within the scope of my claims and without in any manner departing from the spirit of my invention.

Those who are familiar with faucet attachments of connections for attaching portable shower bath devices and for connecting water heaters, will especially appreciate the new function in my attachment wherein the outlet stem of the gasketed connecting member is guided and braced against lateral strains and maintained in position by slidingly passing through an aperture in the yoke frame or support which is securely anchored to the faucet or pipe. Moreover no change or alteration of the pipe or faucet is required.

I claim:—

1. A faucet or pipe clamping attachment, comprising a yoke-shape support adapted to embrace the outlet end of a faucet or pipe, adjustable securing devices carried by the arms of said support to engage said outlet end, an outlet connecting member supported by the cross-member of said yoke support and having a stem passing through an aperture therein, and means whereby said connecting member may be adjusted in the yoke toward or away from said outlet end of the faucet or pipe.

2. A faucet or pipe clamping attachment, comprising a yoke-shape support adapted to embrace the outlet end of a faucet or pipe, adjustable securing devices carried by the arms of said support to engage said outlet end, an outlet connecting member having a stem passing through an aperture in said support and guided therein, means threaded in the cross-member of said support for adjusting said connecting member toward or away from said outlet end of the faucet or pipe, and means interposed between said outlet connecting member and the end of the pipe or faucet for effecting a tight joint.

3. A faucet or pipe clamping attachment, comprising a yoke support adapted to embrace the outlet end of a faucet or pipe, means carried by the yoke arms for detachably securing the support to said outlet end, a fluid outlet connection adjustably mounted between said yoke arms and having a discharge stem passing through an aperture in said yoke and guided therein, and means for adjusting said outlet connection toward or from the end of the faucet or pipe.

In testimony whereof I affix my signature.

MILTON H. SHOENBERG.

Copies of this patent may be obtained for five cents each, by addressing the "Commissioner of Patents Washington, D. C."